(12) United States Patent
Kimiadi

(10) Patent No.: US 7,658,230 B2
(45) Date of Patent: Feb. 9, 2010

(54) HIGH PRESSURE INSULATED ELECTRICAL, FIBER AND TUBING FEED-THROUGH FITTING ASSEMBLY

(75) Inventor: Armanto Kimiadi, Lafayette, LA (US)

(73) Assignee: Baker Hughes Incorporated, Houston, TX (US)

( * ) Notice: Subject to any disclaimer, the term of this patent is extended or adjusted under 35 U.S.C. 154(b) by 180 days.

(21) Appl. No.: 11/940,562

(22) Filed: Nov. 15, 2007

(65) Prior Publication Data

US 2009/0126942 A1    May 21, 2009

(51) Int. Cl.
*E21B 17/02*    (2006.01)
(52) U.S. Cl. .................................. 166/378; 166/65.1
(58) Field of Classification Search .............. 166/378, 166/65.1, 66

See application file for complete search history.

(56) References Cited

U.S. PATENT DOCUMENTS

| 4,560,232 | A | 12/1985 | O'Hara | 339/268 |
| 6,511,335 | B1 * | 1/2003 | Rayssiguier et al. | 439/191 |
| 7,380,841 | B2 * | 6/2008 | Hall et al. | 285/353 |
| 2004/0173352 | A1 * | 9/2004 | Mullen et al. | 166/278 |

* cited by examiner

*Primary Examiner*—William P Neuder
(74) *Attorney, Agent, or Firm*—Shawn Hunter

(57) ABSTRACT

A protective pressure-resistant enclosure, or housing is provided, which can be incorporated into a production assembly within a wellbore. A conductor associated with the monitoring system is passed through a bulkhead using a hermetically sealed arrangement wherein fluid cannot pass between the conductor and the bulkhead. In a currently preferred embodiment, the sealed arrangement includes a conductor fitting which surrounds the conductor and forms a first fluid seal between the conductor fitting and the bulkhead. A compression member is then affixed to the conductor fitting. A pair of nested ferrules are disposed between the conductor fitting and the compression member. When the conductor fitting and the compression member are secured to one another, the ferrules are compressed together to form an active fluid seal against the conductor.

16 Claims, 3 Drawing Sheets

HIGH PRESSURE INSULATED ELECTRICAL, FIBER AND TUBING FEED-THROUGH FITTING ASSEMBLY

BACKGROUND OF THE INVENTION

1. Field of the Invention

The invention relates generally to the enclosure and protection of downhole devices used for recording or measuring downhole conditions. In particular aspects, the invention relates to protective enclosures having a conduit feed-through.

2. Description of the Related Art

Monitoring of downhole wellbore conditions, such as temperature, pressure and flow rates, is needed to conduct optimum production or chemical injection operations within the wellbore. However, devices placed into a downhole environment are subject to extreme conditions, including harsh and corrosive chemicals, high temperatures, abrasives, and great pressure differentials. Gauges and other sensitive monitoring devices must be protected from these downhole conditions. Permanent monitoring devices are often used for reservoir monitoring and should be capable of resisting harsh downhole conditions over a long period of time. When control line tubing, cables or conductors are passed through downhole bulkheads, they provide a leak path through which fluids can undesirably pass.

SUMMARY OF THE INVENTION

The invention provides methods and devices for monitoring wellbore conditions. In preferred aspects, the invention a protective pressure-resistant enclosure, or housing, which can be incorporated into a production assembly within a wellbore. A conductor or tubing associated with the monitoring system is passed through a bulkhead using a hermetically sealed arrangement wherein fluid cannot pass between the conductor and the bulkhead. In a currently preferred embodiment, the sealed arrangement includes a fitting which surrounds the conductor and forms a first fluid seal between the fitting and the bulkhead. When the fitting and the bulkhead are secured to one another, the tapered end of the fitting forms an active fluid seal against the bulkhead. A compression nut is then affixed to the fitting. A pair of nested ferrules is disposed between the fitting and the compression nut. When the fitting and compression nut are secured to one another, the ferrules are compressed together to form an active fluid seal against the conductor.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE PREFERRED EMBODIMENTS

Figure 1:
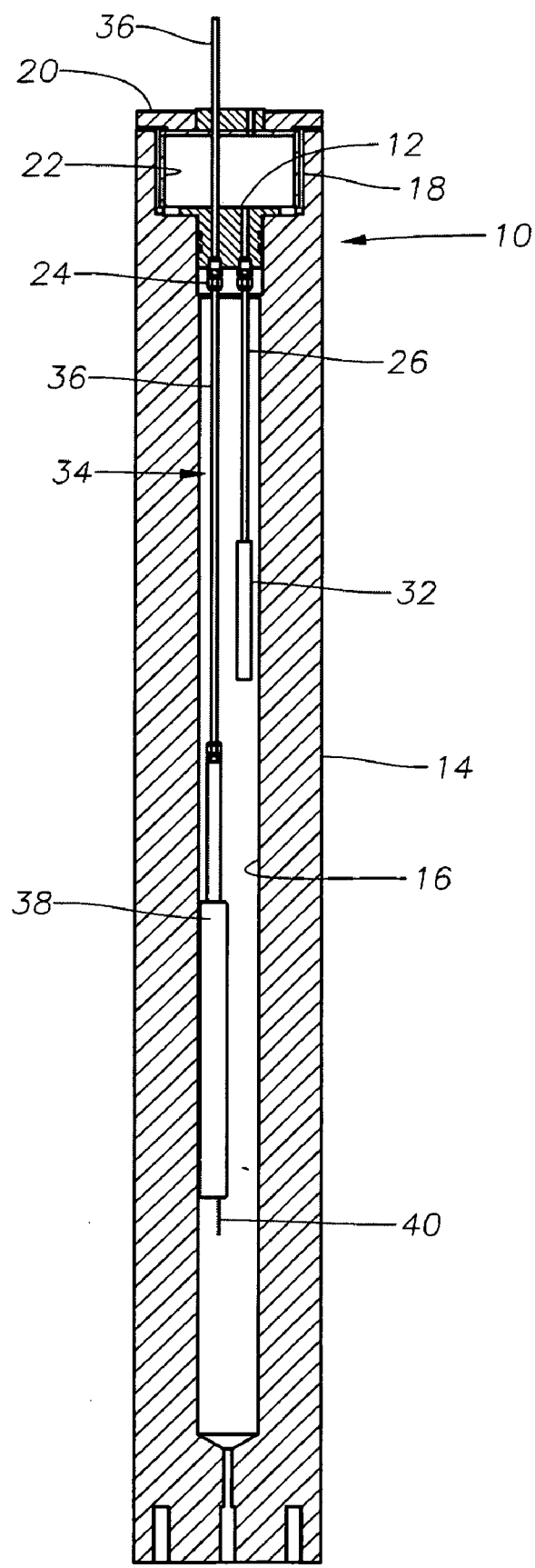
FIG. 1 is a side, cross-sectional view of an exemplary monitoring system constructed in accordance with the present invention.

FIG. 1 illustrates an exemplary monitoring system 10 which is used for monitoring of wellbore conditions within a wellbore (not shown). The monitoring system 10 may be run into a wellbore by wireline or, alternatively, incorporated into a side pocket mandrel or a production string, or disposed into a wellbore according to other methods known in the art. The monitoring system 10 includes a pressure-resistant bulkhead 12 and an outer protective pressure-resistant enclosure 14 which defines a central chamber 16. A pressure-resistant housing 18 is located within the enclosure 14 proximate the upper end of the enclosure 14 and closed off by gland nut 20. In the depicted embodiment, the housing 18 is generally cylindrically-shaped and defines an interior enclosure 22. However, other suitable shapes may be used.

Figure 2:
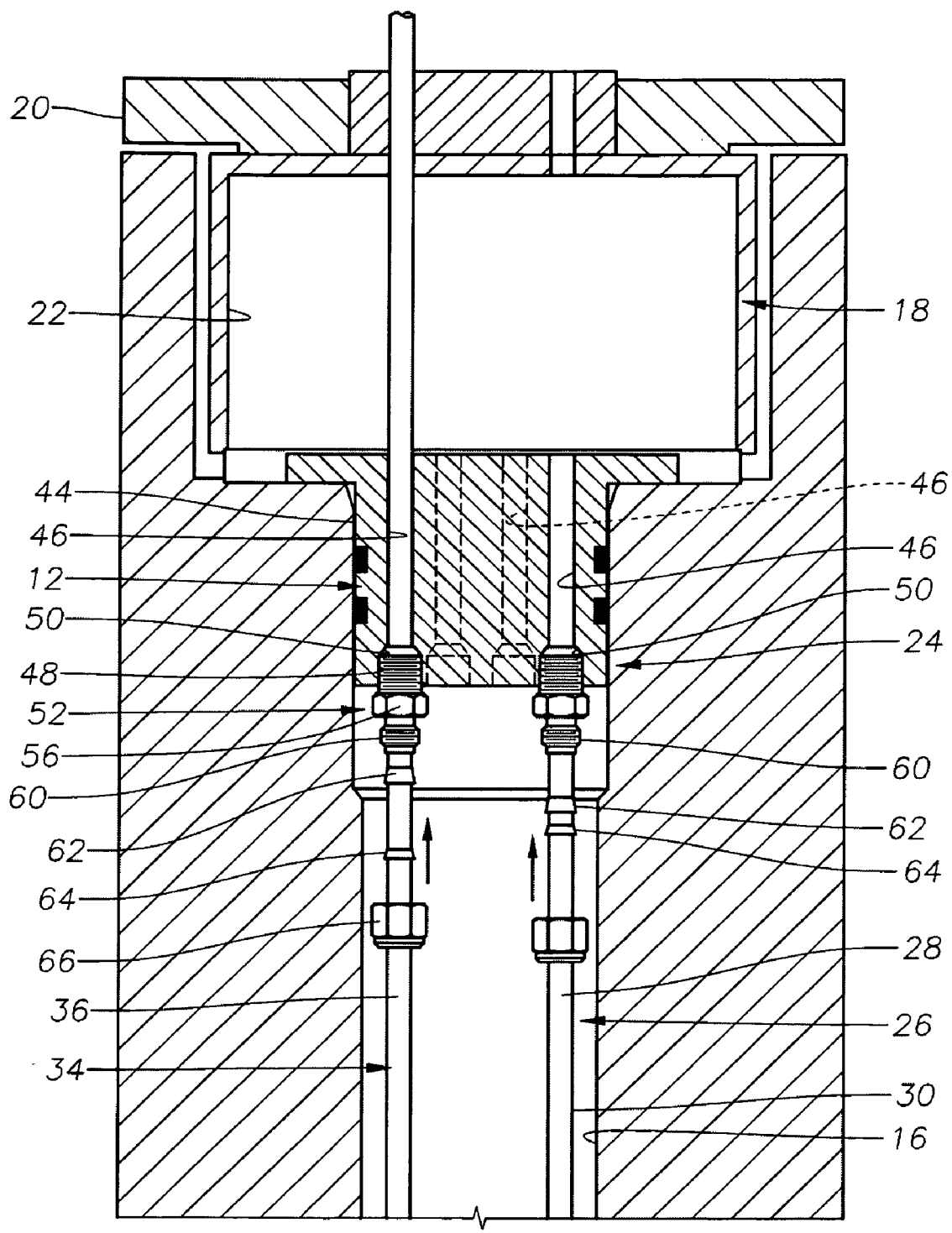
FIG. 2 is a side, partial cross-section of an exemplary pressure housing with feed-through arrangement, in accordance with the present invention.

FIG. 2 illustrates portions of the monitoring system 10 in greater detail. An interface fitting 24 is affixed to the lower end of the bulkhead 12. Extending downwardly from the interface fitting 24 within the chamber 16 is a number of sensors. Temperature sensor housing 26 includes tubing 28 which is capped by tubing endcap assembly 32. A TEC (tubing encapsulated conductor) 36 is a known insulated conductor which is radially surrounded by armor protection and connected to the pressure and temperature gauge assembly 38. The conductor 36 may also comprise a fiber optic cable. The lower end of the temperature sensor housing 26 is enclosed by the endcap assembly 32 (see FIG. 1) which incorporates one of more temperature sensors of a type known in the art.

Also extending downwardly from the fitting 24 is a pressure/temperature sensor assembly 34. The pressure/temperature sensor assembly 34 includes TEC conductor 36 which extends from the interface fitting 24 to a pressure and temperature gauge assembly 38. The pressure and temperature gauge assembly 38 includes pressure and temperature gauges, of a type known in the art for measuring detected pressure and temperature within a wellbore as well as suitable sensors of a type well known in the art for detecting the temperature and/or pressure of wellbore fluids. A fluid communication port 40 is disposed through the enclosure 14 to permit fluid within a surrounding wellbore to enter the shaft 16 and be communicated to the gauge assembly 38.

As shown in FIG. 2, the TEC conductor 36 extends completely through the bulkhead 12 and extends beyond upwardly toward the surface of the wellbore. It is noted that, while temperature and pressure sensors are described in this embodiment, sensor arrangements which measure other downhole parameters, such as flow rate, may be used as well. In addition, more than one tubing encapsulated conductor or fiber optic cable 36 may be disposed through the bulkhead 12 and extend to the surface of the wellbore.

The interface fitting 24 is used to pass the TEC or fiber optic cable 36 from the chamber 16 through the pressure-resistant bulkhead 12 to outside environment. The chamber 16 is exposed to hydrostatic pressure, and therefore, the bulkhead 12 is exposed to high pressure upon its lower side but not its upper side. The interface fitting 24 provides a hermetically-sealed feed-through device for the TEC conductors 28, 36 of the sensors 29, 34. The interface fitting 24 includes a generally cylindrical body 44 attached to bulkhead 24 with axial conductor passages 46 disposed therethrough. The lower end of the passages 46 feature a radially enlarged threaded portion 48 and a conically-tapered contact shoulder 50 that is defined between the passage 46 and the enlarged portion 48.

Figure 3:
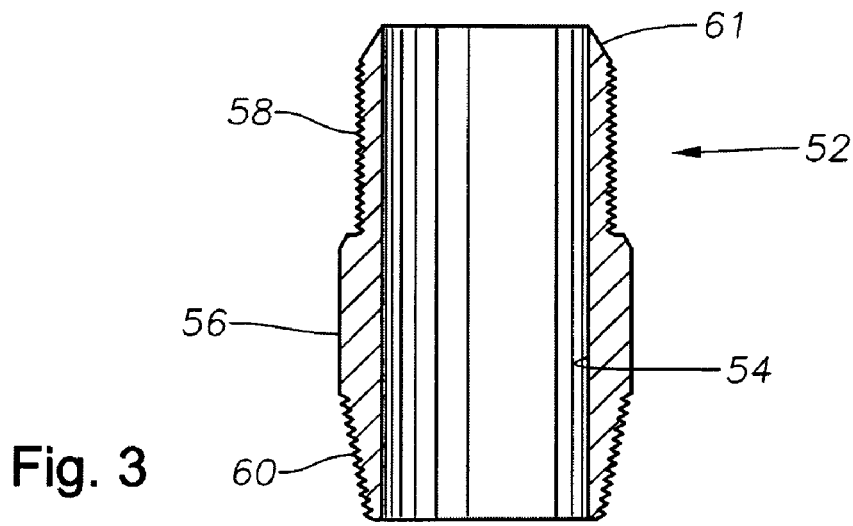
FIG. 3 is a side, cross-sectional view of an exemplary fitting used with the feed-through arrangement shown in FIG. 2.

A conductor fitting 52 radially surrounds the conductor 36 within the chamber 16. FIG. 3 illustrates the conductor fitting 52 in greater detail. The fitting 52 includes a central axial passage 54. The outer radial surface of the fitting 52 features a central portion 56 (shown in FIG. 2 with wrench flats). A pair of threaded portions 58, 60 extends axially outwardly from the central portion 56. A flat tapered sealing surface 61 is located above the upper threaded portion 58. The first threaded portion 58 is then threaded into the threaded portion 48 of the interface fitting 24. This tapered sealing surface 61 seals against the tapered contact shoulder 50 of the bulkhead 24 to provide a hermetic seal between the fitting 52 and the tapered contact shoulder 50 of the bulkhead 12.

Figure 4:
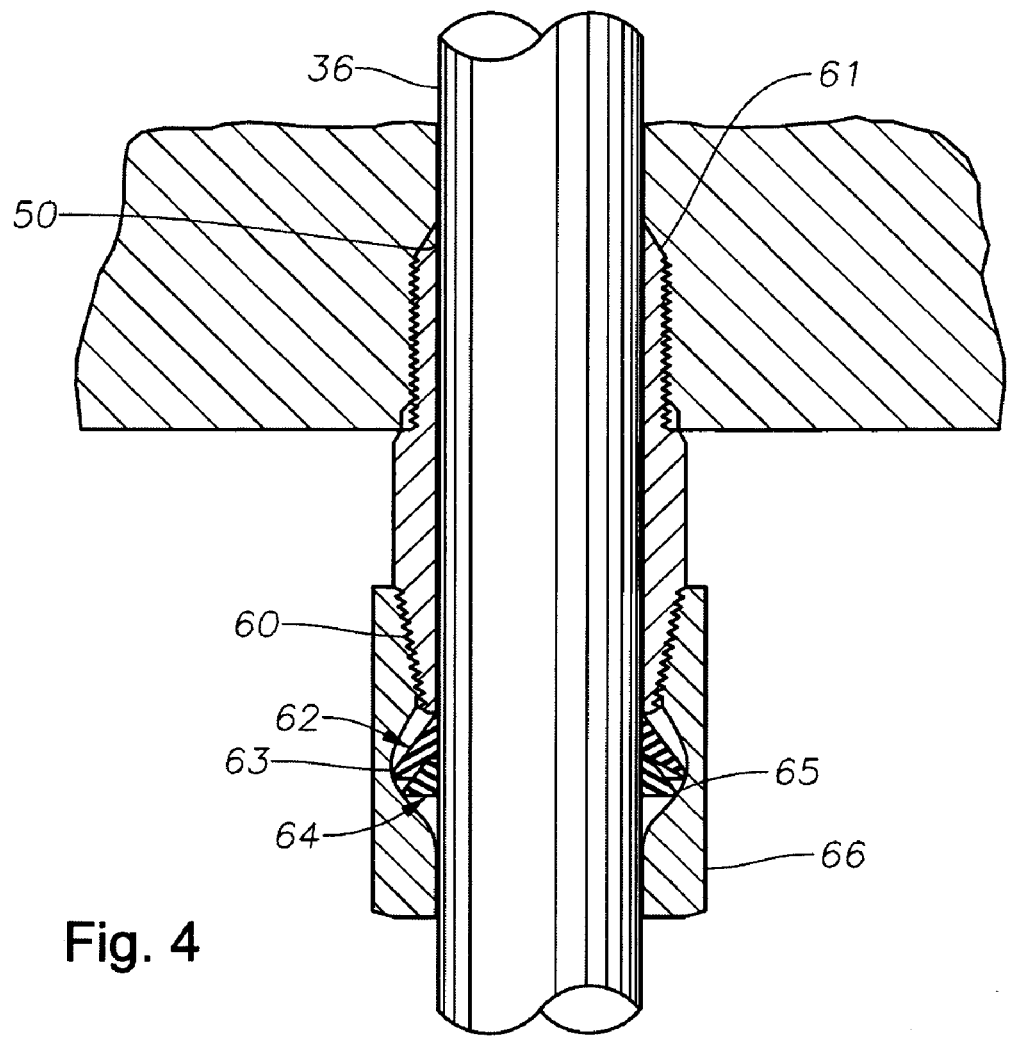
FIG. 4 is a side, cross-sectional view of an exemplary compression fitting used with the feed-through arrangement shown in FIGS. 1 and 2.

Referring once again to FIG. 2, it can be seen that a first conically tapered ferrule 62 surrounds the conductor 36 below the fitting 52. The first ferrule 62 presents an outwardly and downwardly projecting flange 63, which is shown in FIG. 4. A second conically tapered ferrule 64 surrounds the conductor 36 below the first ferrule 62. The second ferrule 64 presents an outwardly projecting flange 65. The first and second ferrules 62, 64 are stacked and nested one within the other. The first and second ferrules 62, 64 may be fashioned of a malleable metal or another suitable resilient material, such as composite or thermoplastic. As shown in FIG. 4, a lower compression member 66 is secured to the second threaded portion 60 of the fitting 52, thereby compressing the first and second ferrules 62, 64 between the fitting 52 and the compression member 66. The compression member 66 may be a nut. The ferrules 62 and 64 are compressed into a nested relationship such that the lower ferrule 64 is compressed below the flange 63 of the upper ferrule 62. The flange 63 of the first ferrule 62 is expanded radially outwardly and into sealing engagement with the surrounding nut 66. Compression of the first ferrule 62 downwardly onto the second ferrule 64 will urge the second ferrule 64 radially inwardly and into sealing engagement with the conductor 36. It is noted that one can also use fiber optic cables or control line cabling in place of TEC conductors 28, 36 for transmission of data or liquid into or out of the enclosure 16. The compressed ferrules provide an arrangement wherein fluid sealing is provided between the second nut 66 and the conductor 36. The fitting 52, compression member 66 and the ferrules 62, 64 collectively form a sealing assembly which prevents fluid leakage through the axial passage 46 around the conductor 36.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention.

What is claimed is:

1. An interface fitting for use in passing a conductor through a bulkhead, the interface comprising:
   a bulkhead having an axial conductor passage disposed therethrough;
   a conductor associated with a sensor, the conductor passing through the axial conductor passage;
   a conductor fitting radially surrounding the conductor and being threadedly secured to the bulkhead to form a fluid seal between a compression member and the bulkhead;
   a compression member secured to the conductor fitting;
   a ferrule surrounding the conductor and disposed between the conductor member and the compression member, the ferrule forming a fluid seal between the compression member and the conductor; and
   a second ferrule surrounding the conductor and disposed between the conductor member and the compression member.

2. The interface fitting of claim 1 wherein the first and second ferrules are nested one within the other.

3. The interface fitting of claim 1 wherein the first ferrule is substantially conically shaped.

4. The interface fitting of claim 1 wherein the conductor comprises a tubing encapsulated conductor.

5. The interface fitting of claim 1 wherein the conductor comprises a fiber optic cable.

6. The interface fitting of claim 1 wherein the conductor comprises control tubing for conducting fluid.

7. The interface fitting of claim 1 wherein the conductor fitting forms a fluid seal against a tapered contact shoulder on the bulkhead.

8. A monitoring system for monitoring downhole conditions in a wellbore, the system comprising:
   a protective enclosure defining an axial chamber;
   a sensor for detecting a downhole condition disposed within the axial chamber;
   a bulkhead enclosing the chamber, the bulkhead having an axial passage through which the sensor is passed;
   a sealing assembly for preventing fluid leakage through the axial passage of the bulkhead, the sealing assembly comprising:
      a conductor fitting radially surrounding the conductor and being threadedly secured to the bulkhead to form a fluid seal between the conductor fitting and the bulkhead;
      a compression member secured to the conductor fitting;
      a ferrule surrounding the conductor and disposed between the conductor fitting and the compression member, the ferrule forming a fluid seal between the compression member and the conductor; and
      a second ferrule surrounding the conductor and disposed between the conductor fitting and the compression member.

9. The monitoring system of claim 8 wherein the first and second ferrules are nested one within the other.

10. The monitoring system of claim 8 wherein the first ferrule is substantially conically shaped.

11. The monitoring system of claim 8 wherein the conductor comprises a tubing encapsulated conductor cable.

12. The monitoring system of claim 8 wherein the conductor comprises a fiber optic cable.

13. A method of sealingly disposing a sensor conductor through a bulkhead comprising the steps of:
   disposing the sensor conductor through a passage through the bulkhead;
   securing a conductor fitting surrounding the conductor to the passage to form a first fluid seal between the conductor fitting and the bulkhead;
   disposing a first ferrule around the conductor;
   disposing a second ferrule around the conductor; and
   securing a compression member surrounding the conductor to the conductor fitting, the conductor fitting and the compression member compressing the ferrule to form a second fluid seal between the conductor and the compression member.

14. The method of claim 13 wherein the conductor fitting forms a first fluid seal by urging a flat tapered sealing surface against a tapered contact shoulder of the bulkhead.

15. The method of claim 13 further comprising the step of: securing the compression member against the conductor fitting to compress the first and second ferrules together.

16. The method of claim 15 wherein the first and second ferrules are generally conically shaped and compressed into a nested configuration.

* * * * *